(12) United States Patent
Emmick et al.

(10) Patent No.: US 6,910,040 B2
(45) Date of Patent: Jun. 21, 2005

(54) SYSTEM AND METHOD FOR XML BASED CONTENT MANAGEMENT

(75) Inventors: David J. Emmick, Issaquah, WA (US); Michael L. Barta, Seattle, WA (US); Bryn Christopher Waibel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 10/121,767

(22) Filed: Apr. 12, 2002

(65) Prior Publication Data

US 2003/0195885 A1 Oct. 16, 2003

(51) Int. Cl.[7] .............................................. G06F 17/30
(52) U.S. Cl. ................... 707/8; 707/9; 707/10
(58) Field of Search .................... 707/1–10, 100–104.1, 707/203

(56) References Cited

U.S. PATENT DOCUMENTS 6,141,655 A * 10/2000 Johnson et al. ................. 707/2
6,192,371 B1 * 2/2001 Schultz .................... 707/103 R

OTHER PUBLICATIONS

Ceri, S. et al., "Web Modeling Lanuage (WebML): A Modeling Language for Designing Web Sites," *Computer Networks*, 2000, *33(1–6)*, 137–157.

Martin, P. et al., "Embedding Knowledge in Web Documents," *Computer Networks*, 1999, *31(11–16)*, 1403–1419.

Patrick, D.A., "Putting XML to Work," *Business–to–Business Advantages Through Enterprise Content Management*, 1999, 7 pages.

Rawolle, J. et al., "XML–Based Integration for Internet Publishers—The Case of BertelsmannSpringer," *Wirtschaftsinformatik*, 2002, *44(1)*, 19–28 (English language abstract attached).

Yoo, S.B. et al., "Web–Based Knowledge Management for Sharing Product Data in Virtual Enterprises," *International J. Production Economics*, 2002, *75(1–2)*, 173–183.

* cited by examiner

Primary Examiner—Charles Rones
Assistant Examiner—Neveen Abel-Jalil
(74) Attorney, Agent, or Firm—Woodcock Washburn LLP

(57) ABSTRACT

System and method for a content management system are described. The content management system takes complex hierarchically represented content structures and represents the hierarchical model by way of a relational model that creates node tables and edge tables to represent various content structures. Moreover, the content is separated from the structure such that the same content units may be used by multiple content structures.

22 Claims, 12 Drawing Sheets

SYSTEM AND METHOD FOR XML BASED CONTENT MANAGEMENT

FIELD OF THE INVENTION

The present invention relates generally to the field of computing. More particularly, the invention relates to a system and method for content management.

BACKGROUND OF THE INVENTION

In the digital realm, content includes any type of digital information that is used to populate a document, a document page, a web page, etc. The digital data can be text, images, graphics, video, sound etc. Content management systems (CMS) have been developed that provide the controls to effectively manage this digital content. Content management systems provides for the management of the content, by combining rules, process and/or workflows in such a way that decentralized authors/editors can create, edit, manage and publish all the content of a document or web pages.

The concept of content differs from that of a document. Prior to the development of content management systems, much effort was focused on document management systems (DMS) that provided companies with the ability to gain control over the ever increasing amount of information that they were producing using products like Word, Lotus123, Excel, etc. Companies recognized the need to internally organize documents such as word files, spreadsheets, PowerPoint presentations etc. The need to organize documents resulted in the development of DMS's.

With the onslaught of the web and the need to manipulate content at a more granular level than a document provides, many have recognized the need for a variation of the basic DMS. Both CMS's and DMS's enable information to be managed according to rules, processes and workflows, the main differentiation between the two products becomes the granularity of management of the digital information a CMS offers when compared to a DMS. A DMS generally deals with a document as a whole and the information that the document contains is essentially irrelevant. On the other hand, a CMS effectively manages at a micro level the individual units of information that go to making up a document or web page.

The Internet is redefining the way organizations create and publish corporate information and documents. Intra-, inter- and extra-nets are replacing the document approach to the storage of information with online, up-to-date web based information. The result of this shift is that companies are more interested in managing information at the more granular content level rather than the less granular document level.

XML is rapidly becoming the vehicle of choice as a definition language for the description of content-related structures. XML provides great flexibility and universality because XML provides a grammar that can express nearly any content. On the Internet in particular, the standardized representation of content structures fosters the development of previously unrecognized applications.

In addition to the rise of structured content like XML, relational databases have long been the bulwark of the information infrastructure of countless businesses. Relational databases provide a primary tool for business to maintain, access, and analyze data. Such database technologies have evolved over many years so that they are optimized for accessing and manipulating large information bases. Many businesses store the majority of their critical information in relational databases. Moreover, many Internet sites manage their content using relational database technology. The database approach to content management also makes it possible to develop database search engines for sifting through the large volumes of information that "live" on the Internet.

The disconnect between XML and relational databases is that one is hierarchically structured and the other is relationally structured to provide efficient management of large amounts of data. The combination of database technology with self-describing structure of hierarchical languages such as XML opens an interesting perspective for CMS's. One vexing issue is presented when ensuring that seemingly inapposite theoretical constructs between the two data representations are harmonized.

SUMMARY OF THE INVENTION

The invention provides a system and method for representing content graphs in a relational database manager for physical instantiation by defining the nodes and relationships as entities in the database. The Dublin core forms the base group of data model entity attribution. This forms a quick physical index scheme for content search and use. The Dublin Core Metadata Initiative serves as the definition of commonly used meta data and forms the core meta data of the CMS Store. This repository is a forest of node-labeled trees in a Dublin core attributed graph store with C# assemblies exposed as Web Service with Content one-level abstracted from structure.

The invention facilitates the creation of consumable content, based on an expandable razor/blade approach; content is targeted for multiple consumption methods with targeting editorial voice based upon target platform and audience. Different devices such as digital phones, tablets and PC's require different presentation due to device limits and constraints. Services can be targeted using SOAP for application consumption. Audiences can be targeted with separate navigation, editorial voice and content.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
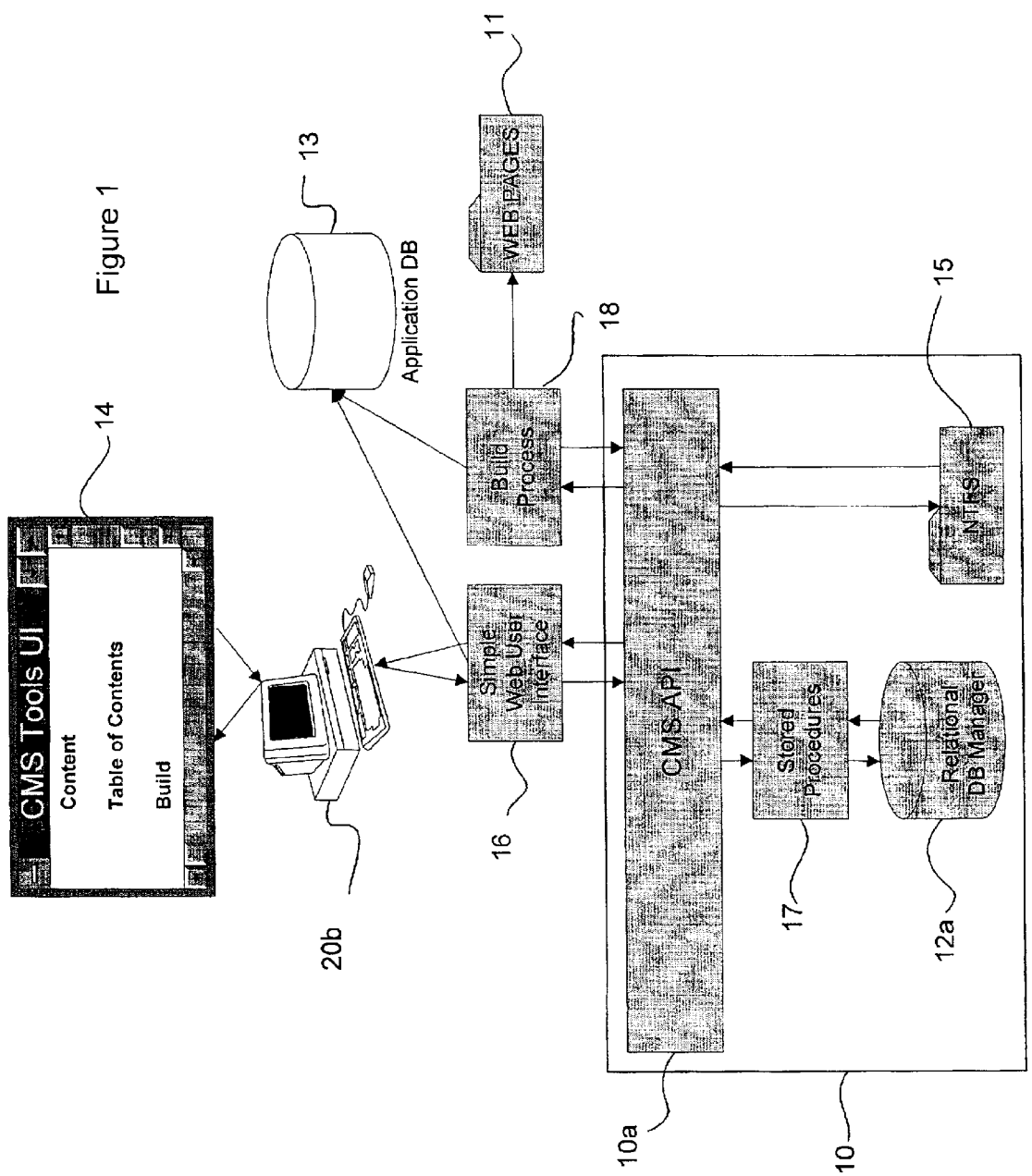
FIG. 1 is a schematic diagram of a content management system in accordance with the present invention.

The foundation of the content store in accordance with aspects of the invention is based on three basic graphs:

1) Content—Subject
2) Structure
3) Organization

The graphs are converted into a SQL database manager for physical instantiation by moving into set theory and defining the nodes and relationships as entities. The Dublin core forms the base group of data model entity attribution. This forms a quick physical index scheme for content search and use. The Dublin Core Metadata Initiative serves as the definition of commonly used meta data and forms the core meta data of the CMS Store.

The invention facilitates the creation of consumable content, based on an expandable razor/blade approach; content is targeted for multiple consumption methods with targeting editorial voice based upon target platform and audience. Different devices such as digital phones, tablets and PC's require different presentation due to device limits and constraints. Services can be targeted using SOAP for application consumption. Audiences can be targeted with separate navigation, editorial voice and content.

The following definitions are useful guides in understanding the present invention. Note, however, that the definitions below are known to those of ordinary skill in the art and are presented here for convenience of the reader.

XML

XML stands for eXtensible Markup Language. It is not a language per se but rather a meta language for creating languages. XML provides structure to a document by using tags. XML is a markup language for creating other markup languages. XML was designed to be extensible and simple to implement and is based on SGML. A document that follows XML rules is said to be well-formed. A document can be invalid, but still be well-formed. A valid XML document conforms to a DTD or XML-Schema.

Since XML is text-based data type, it is a lightweight and small, making it an efficient transport protocol for dynamic and consumable content. XML allows the efficient exchange of data between applications making it useful for distributed applications. XML schemas are an agreed upon industry-wide initiative to share common application languages based upon XML. The Organization for the Advancement of Structured Information Standards sponsors the ww.xml.org site. The site hosts industry group schemas.

XSL

XSL stands for eXtensible Style sheet Language. It is a language for expressing stylesheets and provides display semantics for XML. SXL maps XML elements into HTML or any other formatting language. It is similar in functionality to Cascading Style Sheets (CSS).

XML-Schema

XML-Schema, a current proposal, is a replacement for DTD. DTD, Document Type Declaration, was designed for legacy text and is not XML compliant. DTD does not support data type validation and supports only one document. A Schema working Group was established to propose the standard to the W3C (see http://www.w3.org/1999/05/06-xmlschema-1/). Schemas support XML syntax and data typing. It is an open content model that supports inheritance, constraints and namespaces. Namespaces are a way to share data between organizations and are a way to avoid element definition collision.

Schemas are built in XML and can be used via DOM in Visual Basic or VBScript in ASP. Schemas provide datatypes such as float, currencies as well as relationships between elements. Schemas are extensible and allow for user defined data types.

SOAP

SOAP stands for Simple Object Access Protocol (sometimes seen as XOAP). SOAP is an XML-based programming interface that is machine and language independent. It will travel through firewalls. It is extensible and loosely coupled. SOAP uses XML for remote invocation of object methods and can interact with COM, CORBA or EJB. SOAP's goals are to create a standard object invocation protocol built on Internet standards, XML and HTTP that is extensible with an evolving payload format.

Dublin Core Metadata Initiative

A recognized external standards initiative built around Library sciences, the Dublin Core specifies the following fifteen (15) tags for building card catalogs and meta data. These tags could form the basis for classifying and tagging:

Title, Creator, Subject, Description, Publisher, Contributor, Date, Type, Format, Identifier, Source, Language, Relation, Coverage, Rights.

Details of the Dublin Core can be found at the following web address:

http://purl.org/dc/documents/rec-dces-19990702.htm

The Dublin Core tags are defined as briefly follows:

Element: Title

| | |
|---|---|
| Name: | Title |
| Identifier: | Title |
| Definition: | A name given to the resource. |
| Comment: | Typically, a Title will be a name by which the resource is formally known. |

Element: Creator

| | |
|---|---|
| Name: | Creator |
| Identifier: | Creator |
| Definition: | An entity primarily responsible for making the content of the resource. |
| Comment: | Examples of a Creator include a person, an organization, or a service. Typically, the name of a Creator should be used to indicate the entity. |

Element: Subject

| | |
|---|---|
| Name: | Subject and Keywords |
| Identifier: | Subject |
| Definition: | The topic of the content of the resource. |
| Comment: | Typically, a Subject will be expressed as keywords, key phrases or classification codes that describe a topic of the resource. Recommended best practice is to select a value from a controlled vocabulary or formal classification scheme. |

Element: Description

| | |
|---|---|
| Name: | Description |
| Identifier: | Description |
| Definition: | An account of the content of the resource. |
| Comment: | Description may include but is not limited to: an abstract, table of contents, reference to a graphical representation of content or a free-text account of the content. |

Element: Publisher

| | |
|---|---|
| Name: | Publisher |
| Identifier: | Publisher |
| Definition: | An entity responsible for making the resource available |
| Comment: | Examples of a Publisher include a person, an organization, or a service. Typically, the name of a Publisher should be used to indicate the entity. |

Element: Contributor

| | |
|---|---|
| Name: | Contributor |
| Identifier: | Contributor |
| Definition: | An entity responsible for making contributions to the content of the resource. |

-continued

| | |
|---|---|
| Comment: | Examples of a Contributor include a person, an organization, or a service.<br>Typically, the name of a Contributor should be used to indicate the entity. |

Element: Date

| | |
|---|---|
| Name: | Date |
| Identifier: | Date |
| Definition: | A date associated with an event in the life cycle of the resource. |
| Comment: | Typically, Date will be associated with the creation or availability of the resource. Recommended best practice for encoding the date value is defined in a profile of ISO 8601 and follows the YYYY-MM-DD format. |

Element: Type

| | |
|---|---|
| Name: | Resource Type |
| Identifier: | Type |
| Definition: | The nature or genre of the content of the resource. |
| Comment: | Type includes terms describing general categories, functions, genres, or aggregation levels for content. Recommended best practice is to select a value from a controlled vocabulary (for example, the working draft list of Dublin Core Types).<br>To describe the physical or digital manifestation of the resource, use the FORMAT element. |

Element: Format

| | |
|---|---|
| Name: | Format |
| Identifier: | Format |
| Definition: | The physical or digital manifestation of the resource. |
| Comment: | Typically, Format may include the media-type or dimensions of the resource. Format may be used to determine the software, hardware or other equipment needed to display or operate the resource. Examples of dimensions include size and duration.<br>Recommended best practice is to select a value from a controlled vocabulary (for example, the list of Internet Media Types defining computer media formats). |

Element: Identifier

| | |
|---|---|
| Name: | Resource Identifier |
| Identifier: | Identifier |
| Definition: | An unambiguous reference to the resource within a given context. |
| Comment: | Recommended best practice is to identify the resource by means of a string or number conforming to a formal identification system.<br>Example formal identification systems include the Uniform Resource Identifier (URI) (including the Uniform Resource Locator (URL)), the Digital Object Identifier (DOI) and the International Standard Book Number (ISBN). |

Element: Source

| | |
|---|---|
| Name: | Source |
| Identifier: | Source |
| Definition: | A Reference to a resource from which the present resource is derived. |
| Comment: | The present resource may be derived from the Source resource in whole or in part.<br>Recommended best practice is to reference the resource by means of a string or number conforming to a formal identification system. |

Element: Language

| | |
|---|---|
| Name: | Language |
| Identifier: | Language |
| Definition: | A language of the intellectual content of the resource. |
| Comment: | Recommended best practice for the values of the Language element is defined by RFC 1766 which includes a two-letter Language Code (taken from the ISO 639 standard), followed optionally, by a two-letter Country Code (taken from the ISO 3166 standard). For example, 'en' for English, 'fr' for French, or 'en-uk' for English used in the United Kingdom. |

Element: Relation

| | |
|---|---|
| Name: | Relation |
| Identifier: | Relation |

-continued

| | |
|---|---|
| Definition: | A reference to a related resource. |
| Comment: | Recommended best practice is to reference the resource by means of a string or number conforming to a formal identification system. |

Element: Coverage

| | |
|---|---|
| Name: | Coverage |
| Identifier: | Coverage |
| Definition: | The extent or scope of the content of the resource. |
| Comment: | Coverage will typically include spatial location (a place name or geographic coordinates), temporal period (a period label, date, or date range) or jurisdiction (such as a named administrative entity).<br>Recommended best practice is to select a value from a controlled vocabulary (for example, the Thesaurus of Geographic Names [TGN]) and that, where appropriate, named places or time periods be used in preference to numeric identifiers such as sets of coordinates or date ranges. |

Element: Rights

| | |
|---|---|
| Name: | Rights Management |
| Identifier: | Rights |
| Definition: | Information about rights held in and over the resource. |
| Comment: | Typically, a Rights element will contain a rights management statement for the resource, or reference a service providing such information. Rights information often encompasses Intellectual Property Rights (IPR), Copyright, and various Property Rights.<br>If the Rights element is absent, no assumptions can be made about the status of these and other rights with respect to the resource. |

FIG. 1 illustrates an overview of the architecture of CMS 10 in accordance with an aspect of the system. CMS 10 provides an application program interface (API) 10a whereby a user uses a CMS Tool UI 14 on a client computer 20b to interface with CMS 10. The user may have an application that keep operates on content in Application DB 13. The user may use a web based interface 16 to access content maintained by CMS 10. Build process 18 generates content from CMS 10 to generate a document, web page, etc. for storage in Application DB 13. The build process then outputs web pages 11, etc. Stored procedures 17 store and retrieve content in Relational DB Management System 12a which manages the structured of the content in accordance with aspects of the invention. NTFS 15 stores various portions of content accessible to the CMS 10.

Illustrative Computer Network Environment

Figure 2:
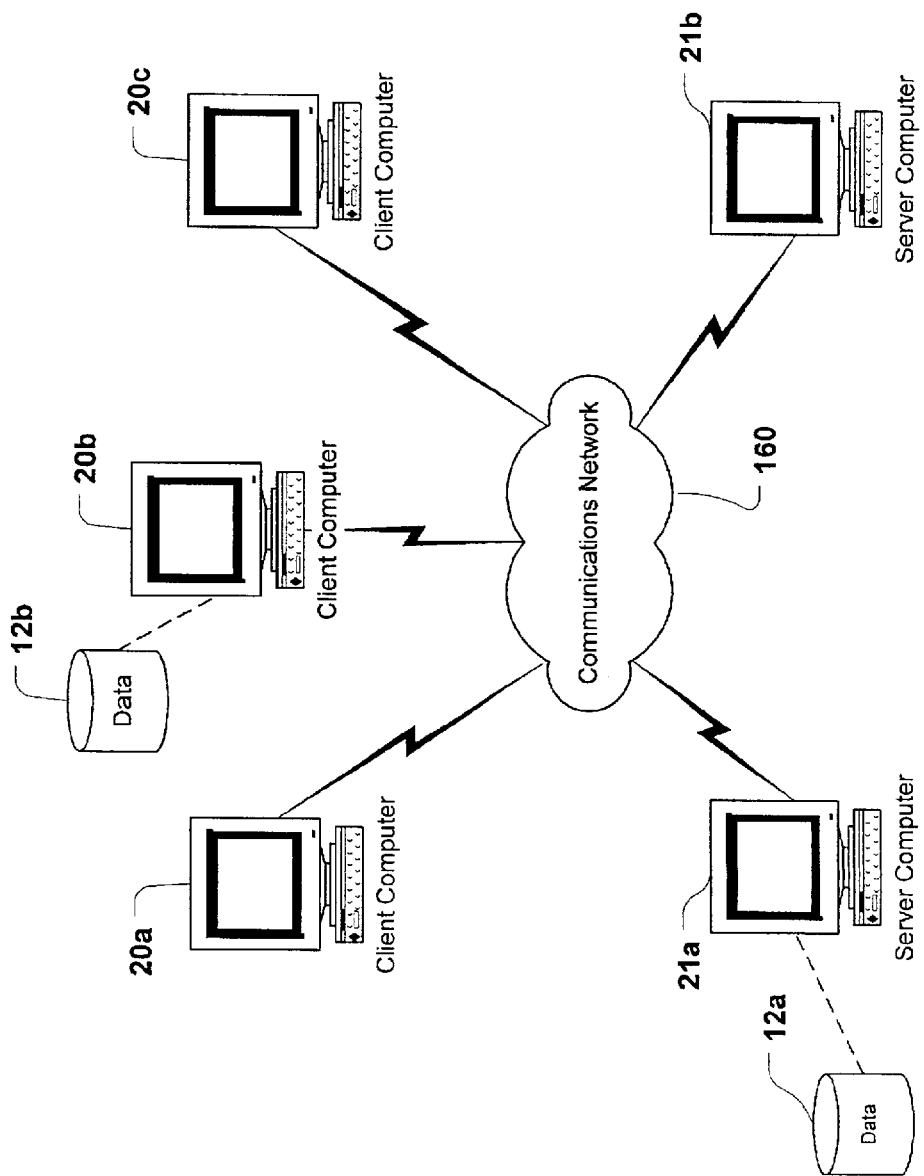
FIG. 2 is an example of a computer network wherein aspects of the present invention may be employed.

FIG. 2 illustrates how the system of FIG. 1 may be configured to communicate in a network environment. Here computers 20a–20c and 21a–21b may host various databases such as databases used in CMS 10 and Application DB 13 in accordance with aspects of the present invention. Although the physical environment shows the connected devices as computers, such illustration is merely exemplary and may comprise various digital devices such as PDAs, network appliances, notebook computers, etc.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 2, computers 20a–20c can be thought of as clients and computers 21a, 21b can be thought of as servers where server 21a maintains the data that is then exported for use by the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

Figure 3:
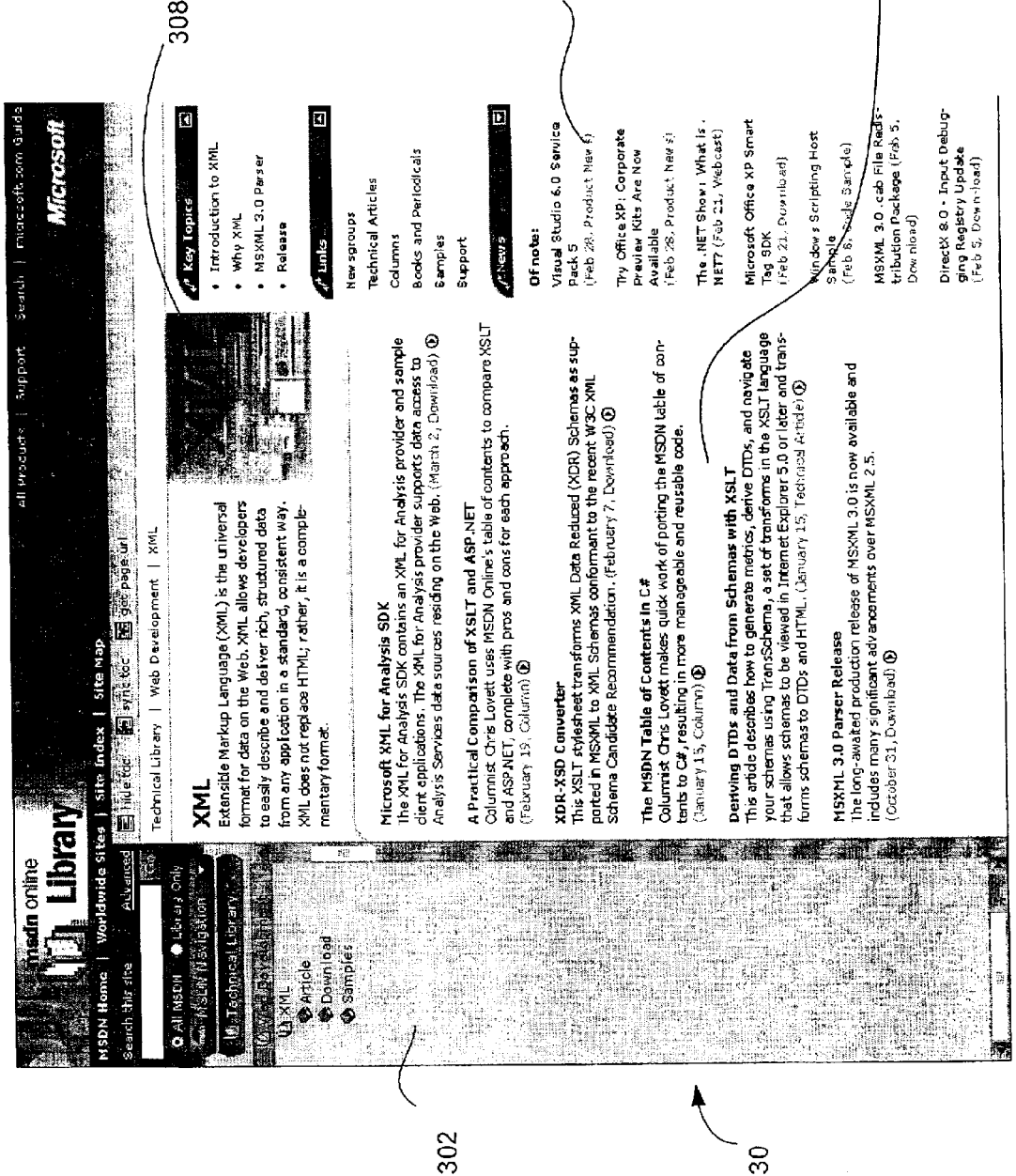
FIG. 3 is a sample of a web page illustrating the content layout and structure provided by a content management system.

FIG. 3 illustrates how the content management system applies content units to build various web pages. Web page 30 comprises a variety of content units that may be reassembled from CMS 10 in a variety of ways to create web pages for different applications. Web page 30, for example, comprises a table of contents 302, subtitles and abstracts 304, news titles 306, and graphics 308.

Data Model

Content normally is expressed mathematically following Named Edge Graph Theory (e.g., title, chapter, paragraph, and so on). Graph Theory is used to express XML and has corollaries to directory structures and content objects—the directory tree for storing content in computers. Graph Theory is much more extensible, allowing more than hierarchical relationships called polyhierarchy, but the allegory is easily grasped.

Relational databases such as SQL is based on Set Theory (Unions, Intersections, etc.). SQL is a great scalable storage and retrieval mechanism for set based information. Graph Theory can be expressed in Set Theory by modeling Graph Theory nodes as collections and elements and Graph Theory edges as relationships (relations between collections, relations between elements and relations between collections and elements). The edges (relationships) between nodes (collections and elements) are named. Thus we have named relationships between elements and elements (such as synonym), collections with collections (related vocabularies), and collections and elements (is member). This is also known as a labeled-edge graph.

In accordance with an aspect of the invention, a distinction is made between leaf nodes containing content and collections containing only structure. CMS 10 is implemented with separate entities for content containing elements and structure collections. This is done primary for performance. Preferably, the edge relationships are named but not enumerated.

Figure 4:
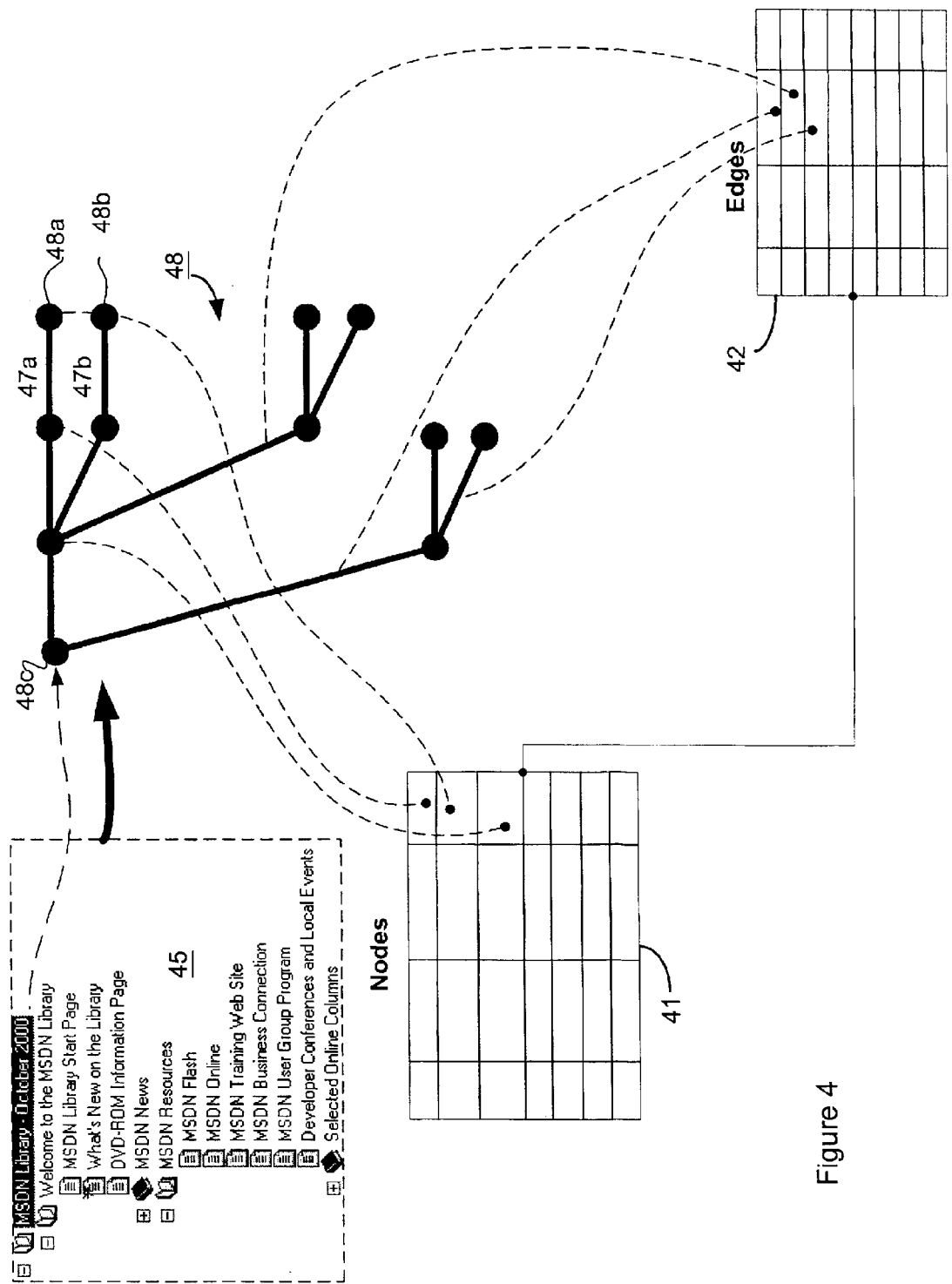
FIG. 4 is an illustration of the mapping of hierarchical content data into a relational node and edge tables.

FIG. 4 Illustrates how the present invention converts a graph structure library, book, or document, e.g., represented by table of contents 45, into relational tables, e.g., 41, 42. The table of contents 45 can be represented by graph 48. Graph 48 is represented by a collection of nodes, e.g., 48a, 48b, etc. The nodes, e.g., 48a, 48b correspond to content and structure in from the structured table of contents 45. Here, root node 45 corresponds to MSDN Library in table of contents 45. Other titles in the table of contents 45 will also be represented by nodes in graph 48. The relationship of titles in the table of contents 45 can be represented by edges in graph 48, e.g., edges 47a, 47b.

Simple Content Subject Graph

Figure 5A:
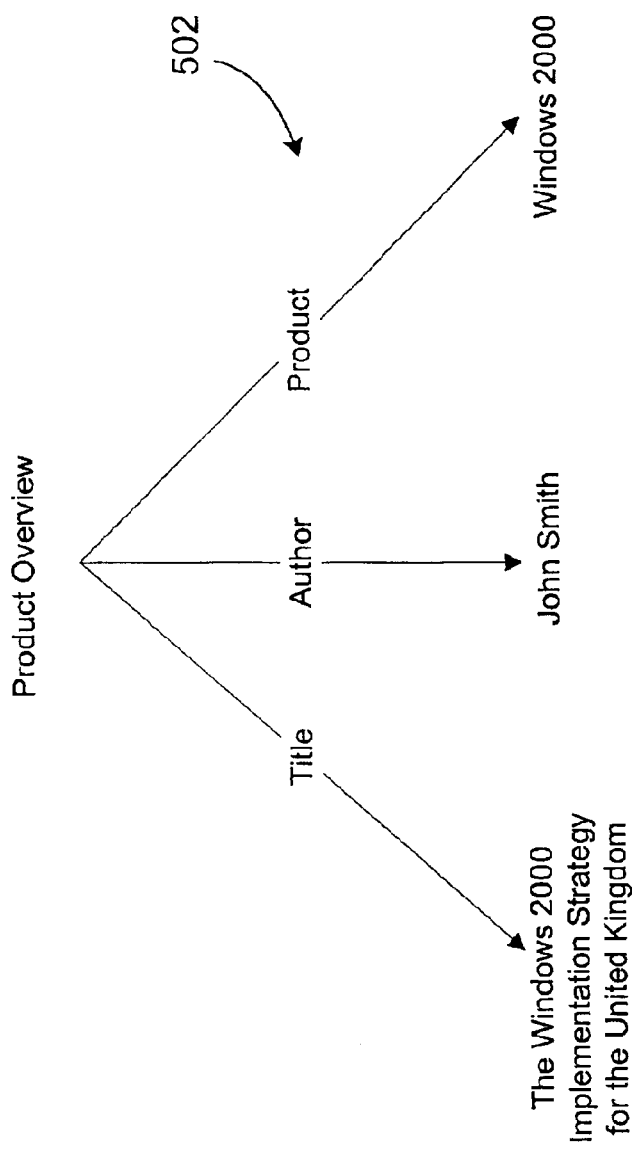
FIGS. 5A–5G illustrate the mapping of hierarchical content data into relation tables where the hierarchical structure is represented by a relational model based on nodes and edges.

FIG. 5A presents a simple subject graph 502 that further illustrates aspects of the invention. Rendered in XML this Simple Subject graph is:

---

<productoverview>
    <title>
    The Windows 2000 Implementation Strategy for the United Kingdom
    </title>
    <author>
    John Smith
    </author>
    <product>
    Windows 2000
    </product>
</productoverview>

---

Well formed XML has matching markups and follows the rules of XML creation. A valid XML has an XML-Schema (XSD) and conforms to that XML-Schema (XSD). The XML-Schema for the example is:

```
<?xml version="1.0" ?>
<Schema name="productoverview"
     xmlns="urn:schemas-microsoft-com:xml-data"
          xmlns:dt="urn:schemas-microsoft-
com:datatypes">
  <!-- ... -->
<ElementType name= "productoverview" content="eltOnly">
     <element type="title"/>
     <element type= "author"/>
     <element type= "product"/>
</ElementType>
     <ElementType name= "title" content='textOnly' order="one"/>
     <ElementType name= "author" content='textOnly' order="one"/>
     <ElementType name= "product" content='textOnly' order="one"/>
```

XML attributes of an XML element can be expressed as either XML elements or XML attributes of the elements. The decision on which to use is made on the concept of future node use. It is easier to break down elements into future element structures than it is to change XML element attributes into XML elements. If no further breakdown is anticipated then attribution is acceptable. XML element definition can be used exclusively and is potentially more flexible in the future.

Expressing the XML graph in a relational data model maps the XML attributes as data model attributes (or sometimes called properties—physically modeled as the columns in the SQL table) of the data model entities (set theory).

CMS 10 is preferably implemented with a distinction between leaf nodes containing information and structure nodes (collections).

Container/Leaf Structure

The container/leaf structure and the actual chunking structure (separate data files) are parallel but orthogonal.

All chunks are containers or leafs, but not all containers or leafs are chunks (chunks contain sub-trees possibly).

Chunks are checked-in/out and versioned, nodes are shared and referenced by version.

Each chunk must be branch-versioned or at least linearly versioned.

Each container can contain:

Children who are distinct chunks (i.e., they are separate files):

As un-sequenced, un-positioned sibling chunks (like a file system or VSS does, where everyone seems like an equal-level child).

As sequenced, un-positioned sibling chunks (order is indicated and preserved presumably by the CMS internal per-container children list).

Children who are not distinct chunks (i.e., they are part of the same chunk as the parent container node).

As sequenced, positioned sibling nodes (order and position is indicated and preserved within the container's content).

Node-to-node referential integrity and counts are preferably tracked and maintained by CMS 10.

Chunks of structured elements (say, XML files) may only expose particular container or leaf elements as addressable for CMS purposes.

Any CMS-aware node (whether it begins a chunk or is itself inside of a chunk) have a CMS-aware ID unique in the namespace of its container node.

The children of a container have unique IDs relative to the container's namespace.

Uniquely addressing a node and desired version from an ancestor scope can always be expressed (preferably by using all the ancestor IDs in some way).

Figure 5C:
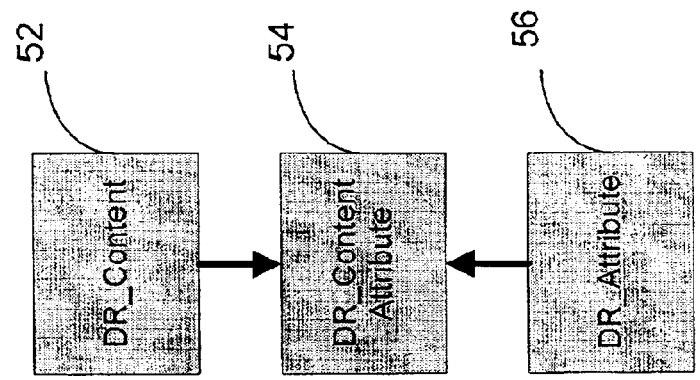
Figure 5B:
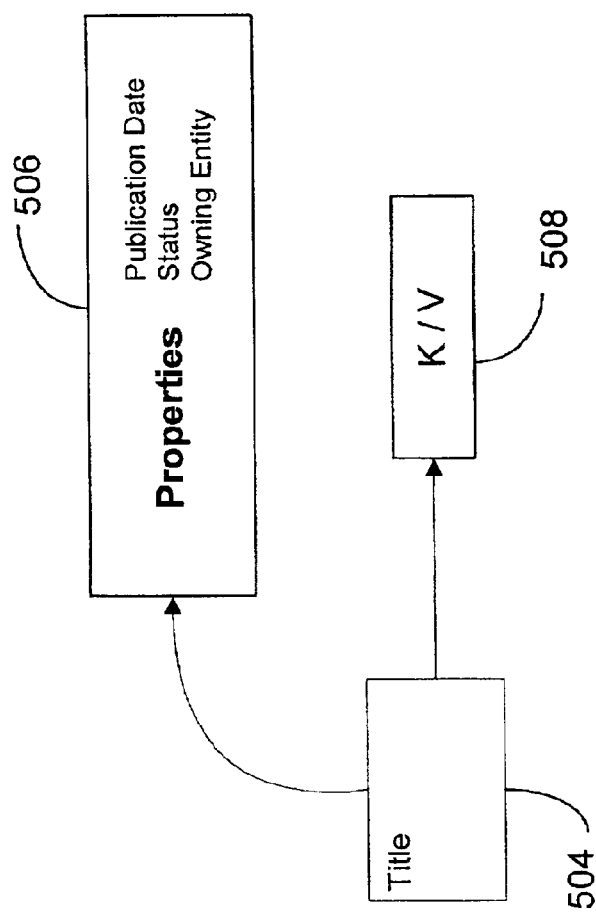

As illustrated in FIG. 5B, content 504 is attributed with various terms to indicate content subject 506. Content carries metadata and relationships as well as key values pairs 508 for attribution. As shown in the entity relationship diagram of FIG. 5C, the content or resource instance is attributed by converting the resource graph into set theory by placing the resource instance (DR_Content) 52 and attribute instance (DR_Attribute) 56 into SQL tables. The labeled edge becomes a many to many relationship table (DR_ContentAttribute) 54. The content associations can be extended to include tree structure that forms the basis of the Table of Contents (TOC). The structure or tree (root, node and leaf) is represented in CMS 10 as separate and distinct tables from the content entity. The tree structure begins with a root element and constructs labeled edge relationships with nodes. The end node or leaf is a relationship to content. Entities can be thought of as "files" and Structure can be thought of as "directories". Structure can also occur within documents—with introductory paragraph, body paragraph etc. The structure node is typed with a "document" to note the leaf node of the TOC navigation structure and the "root" node of the document structure. This makes explicit the distinction between bounded "internal" structure and unbounded "external" structure.

Structure Entity Relationship Model

Figure 5D:
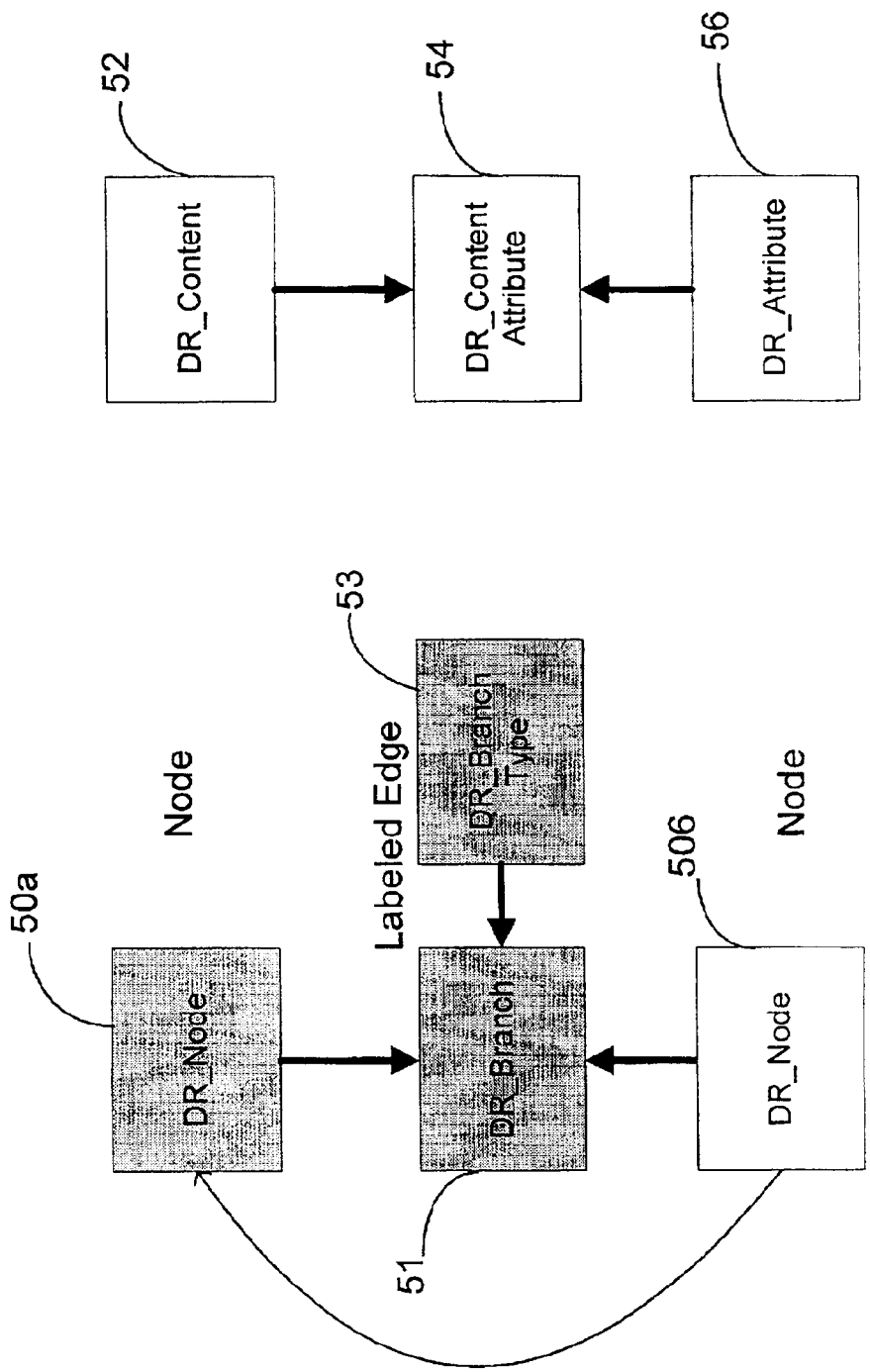
Figure 5E:
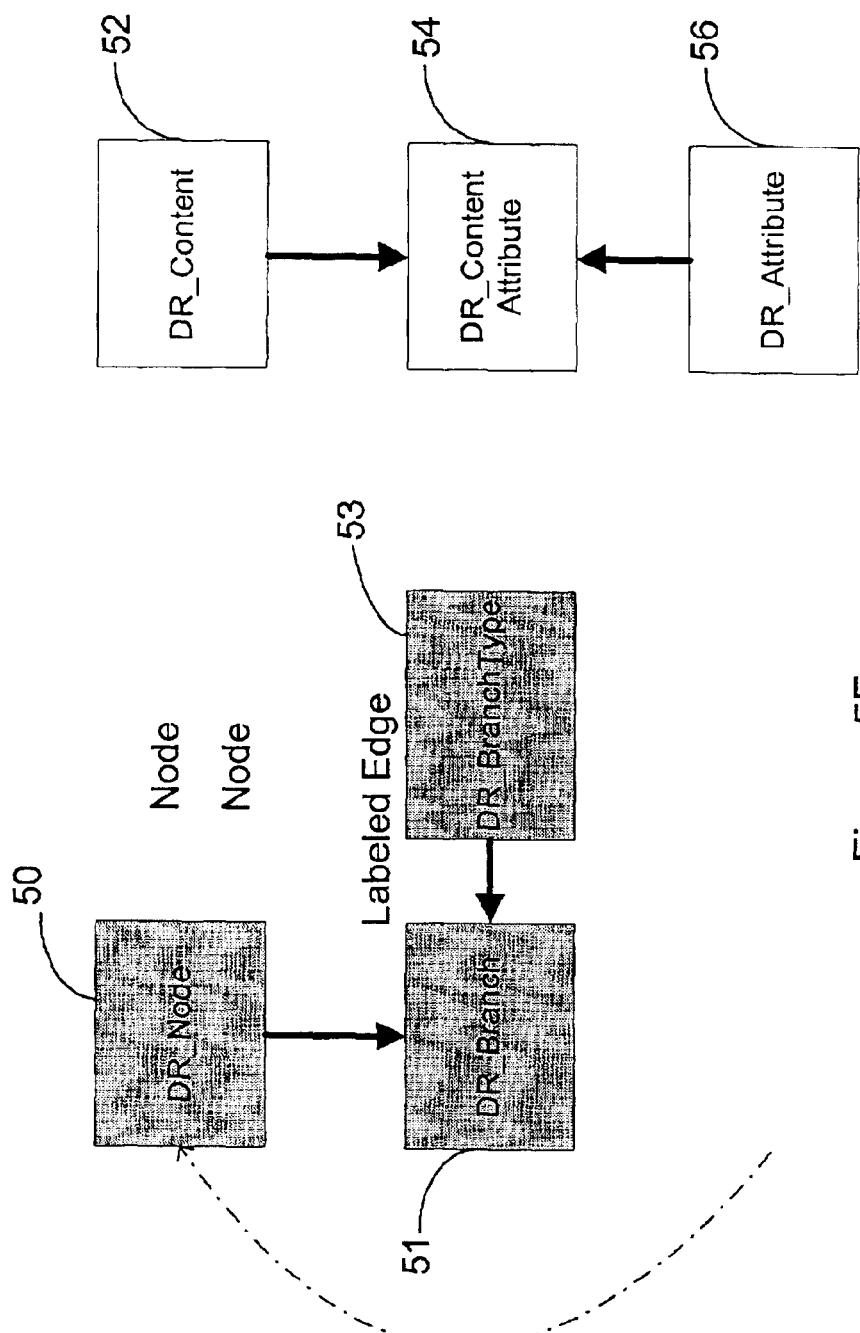

As shown in FIG. 5D, the tree structure graph nodes are represented as Nodes. The labeled edge forms a many to many relationship entity (DR_Branch) 51 and is labeled with a Branch Type 53. Note that the Node entity is used twice 50a, 50b, and thus collapses into a single entity used twice in the relationship (Branch) as shown in FIG. 5E. The Node entity is used for both nodes of the graph.

Content Ownership

Figure 5F:
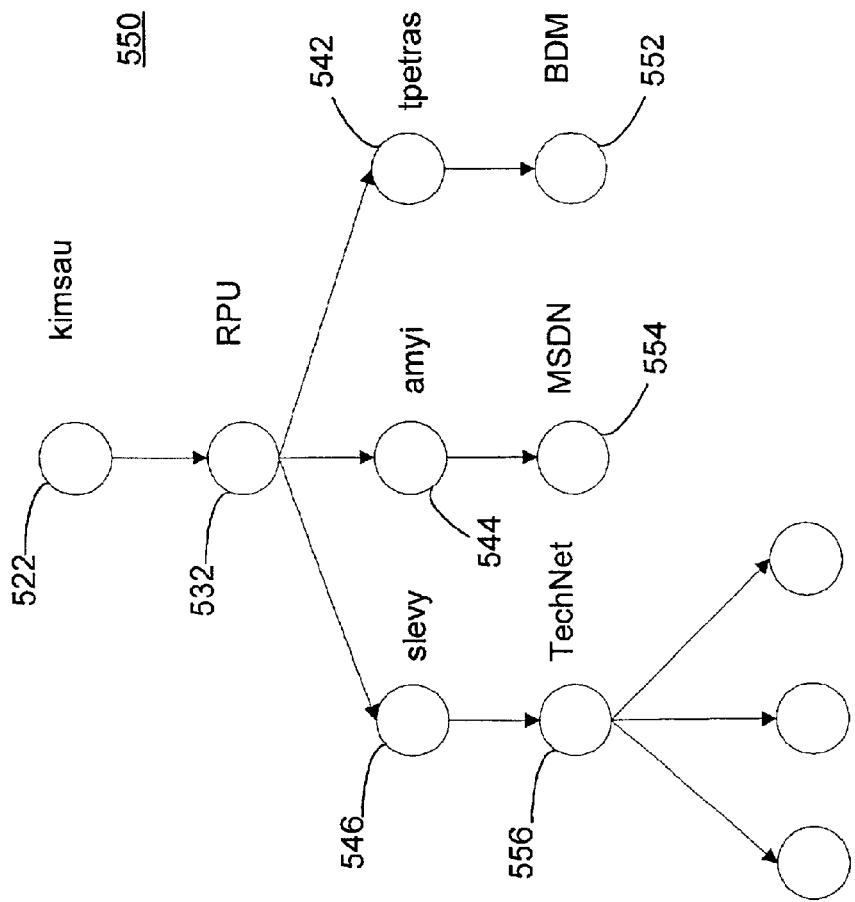

Content also has a notion of ownership. The ownership of content can be represented in graph form as shown in FIG. 5F. For example, certain content in the directed graph 550 including TechNet 556, MSDN 554, and BDM 552 is owned by slevy 546, amyi 544, and tpetras 542. All of this is owned by RPU 532, which is in turn owned by kimsau 522.

Entity Relationship Model

Figure 5G:
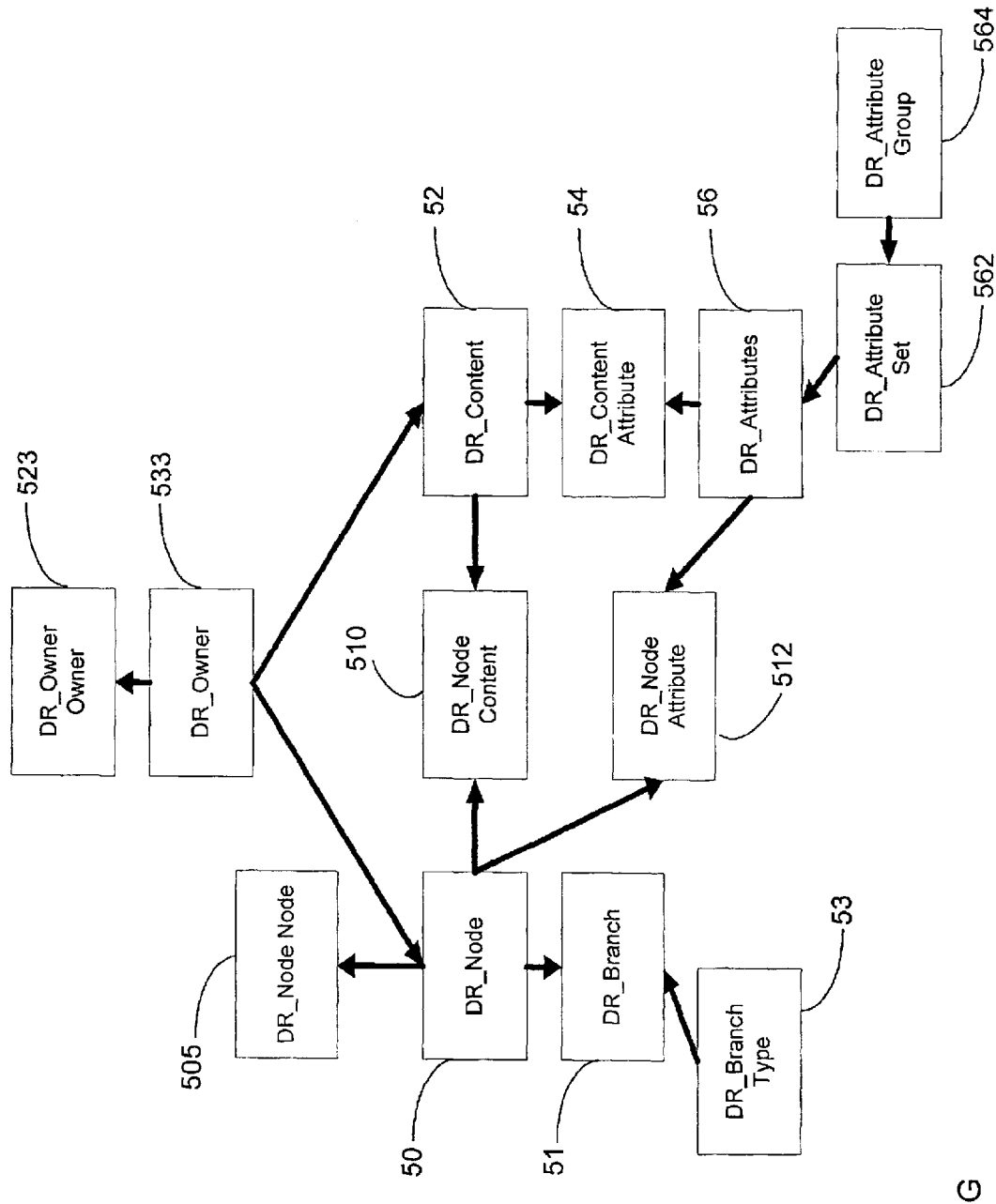

The three graphs: Owner, Structure and Content have different properties. The owner entity does not carry the Dublin core properties. Structure and Content have different relationships and some properties not in common. Content carries a relationship to content data, format and status that structure does not. All three graphs can be represented by a single ER model as shown in FIG. 5G.0

Attributes (DR_Attributes) 56 are grouped in sets (DR_AttributeSet) 562 and sets are grouped in Attribute groups (DR_AttributeGroup) 564.

The content entity is extended by recognizing content versions. The actual content data is related to the content version. A content type is extended and relates to structure as well. A status is applied to version.

The Content Entity (DR_Content) 52 is related to an Owner (DR_Owner) 533 and the status (Dr_ContentStatus).

Entity Model Glossary

The entities and relationships of the ER diagram of FIG. 5G is further described below:

Resource Instance Cluster

Resource: An resource is a unit of Knowledge Management, a content item. Download Overviews, KB Articles and Book Overviews all represent objects.

DR_Content 52

The instance of a content objects metadata.

A resource has a GUID or ID.

Resource Instance, two states: a resource URI—images, streaming media, etc., or a piece of ACCII text. As a metaphor consider that node makes up the card in a library card catalog, the content entity is like the ISBN of the book.

When content can be instantiated as text, the content is stored in the Content column. Otherwise, for binary, graphics, and unstructured content the content is stored in HTFS files and referenced by URI.

Resource Attribution Cluster

In bound attributes are exposed, unbound attributes are not exposed. Bound attributes are expressed in the form of:

<Key group="VSIA" name="devlang" value="C#"/>

DR_Attributes 56

The attribute entity is the subject associations of related content and node entities. It is a key value pair name space token. Key space is global such as source name. This would exclude things like ratings since they are not content. Attributes are vocabulary terms; the individual elements in a vocabulary. An individual word or phrase in a vocabulary can be related to other terms, i.e. WINDOWS 2000, SQL SERVER 2000, OFFICE 10, EXCHANGE 2000, Powerpoint 2000.

DR_AttributeSet 562

The vocabulary or set of attribute values comprise a collection of words or phrases in a list. These can be arranged and explained or defined as a hierarchy. A vocabulary may be controlled or not. A vocabulary represents the set of attribute values that make up an enumerated list.

DR_AttributeGroup 564

The group or "Owner" of vocabulary set. For example, VSIA, MSDN act as a domain boundary which allows multiple taxonomies to be used.

DR_ContentAttribute 54

The relationships between the Content Entity (Subject) and Attributes.

DR_NodeAttribute 512

The relationships between Node Entity (Structure) and attributes.

Resource Tree Structure Cluster

DR_Node 50

A structure graph node is used as the collection node and leaf node: like the file system, the directory, a collection. It is separated from the content entity for ease of use. Structure never has content. Different kinds of structure exist. A structure leaf is related to a Content Entity. A leaf node, as different from a collection or branch node which are Structural Entities.

DR_Branch 51

The parent child relationship between nodes forming a structure tree.

DR_BranchType 53

This entity represents the kind of structure, or hierarchy—like a tree presentation. It represents the label of the edge and indicated dependencies between nodes.

DR_NodeNode 505

This entity forms the relationship between nodes, and is not part of a structure tree. This allows branch to allow attribute inheritance. NodeNode relation allows attribution that is not inherited or bubbled up to the root.

DR_NodeContent 510

This entity represents the relationship between a node and content.

Resource Owner Cluster

DR_Owner 533

This entity represents the organization graph node of the organization tree. It is used as a collection or leaf node. It is used as the owner of content and structure trees.

DR_OwnerOwner 523

This entity represents the parent child relationship between owner nodes forming an organization tree.

Figure 6:
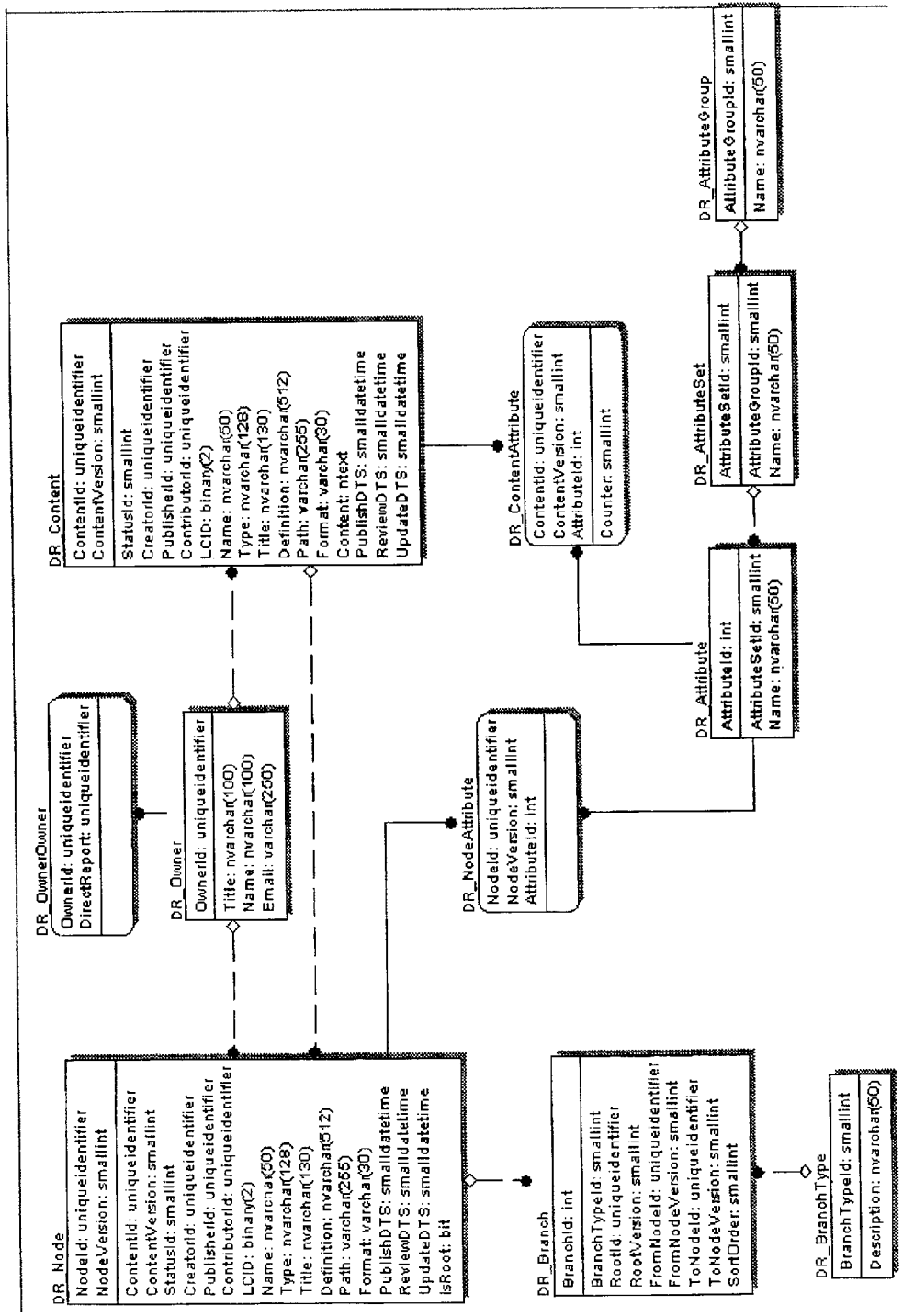
FIG. 6 is an illustration of a database schema derived from an entity relationship model that represents hierarchical content in a relational model.

FIG. 6 further illustrates the data model in accordance with the present invention by providing a database schema wherein content in the form of a graph structure in converted into and stored as a relational model wherein it can be accessed, searched and manipulated by a database management system.

Figure 7:
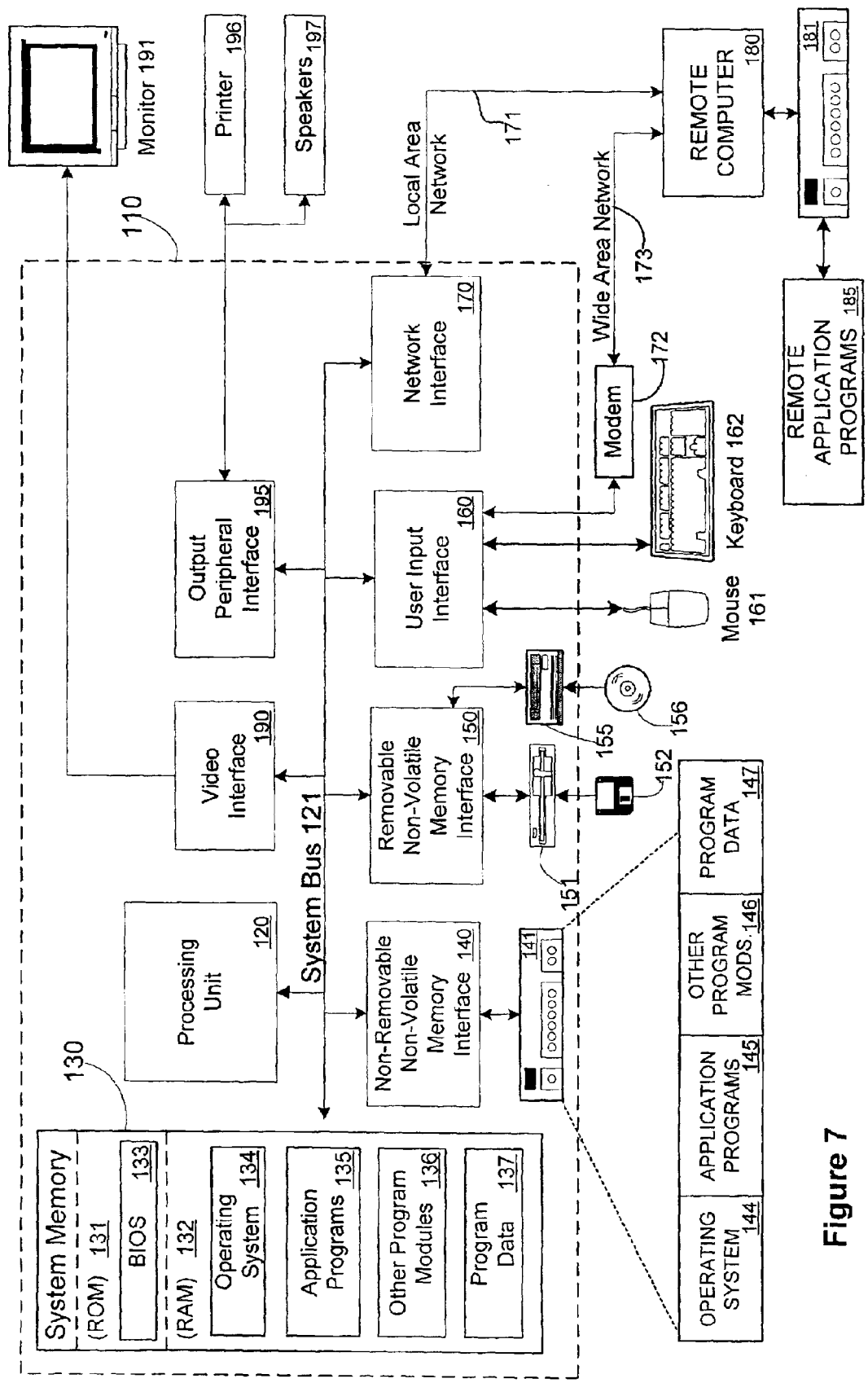
FIG. 7 is a block diagram of an exemplary computing environment in which aspects of the invention may be implemented.

With reference to FIG. 7, an exemplary system for implementing the invention includes a general purpose computing device in the form of a computer 110 that could form a portion of client computer 20a–20c or server computers 21a, 21b (see FIG. 1). Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the appended claims.

What is claimed is:

1. A computer readable medium bearing computer readable instructions for carrying out the process of parsing information arranged in a hierarchical order into a plurality of content units arranged in a hierarchical structure comprising at least one parent node, at least one leaf node, and at least one edge relating the parent node and the leaf node wherein the leaf node is indicative of at least one of the plurality of content units, the parent node and the edge are indicative of a hierarchical order of the information;

providing a relational database comprising a node table and an edge table; and storing the hierarchical structure in the relational database such that the information indicative of the edge is stored in the edge table, information indicative of the parent node is stored within the node table, and information indicative of the leaf node is stored in the node table; and content units are stored in a location accessible by the database whereby the location of the content unit can be determined from the information indicative of the leaf node.

2. A content management system, comprising:

computer readable instructions that parse information arranged in a hierarchical order into a plurality of content units arranged in a hierarchical structure comprising at least one parent node, at least one leaf node, and at least one edge relating the parent node and the leaf node wherein the leaf node is indicative of at least one of the plurality of content units, the parent node and the edge are indicative of a hierarchical order of the information;

a relational database comprising a node table and an edge table;

computer readable instructions that store the hierarchical structure in the relational database such that the information indicative of the edge is stored in the edge table, information indicative of the parent node is stored within the node table, and information indicative of the leaf node is stored in the node table; and content units are stored in a location accessible by the database whereby the location of the content unit can be determined from the information indicative of the leaf node.

3. The system as recited in claim 2 wherein the at least one parent node is indicative of a category of the content unit.

4. The system as recited in claim 2 wherein the content unit comprises text.

5. The system as recited in claim 2 wherein the content unit comprises a graphic.

6. The system as recited in claim 2 further comprising an ownership structure, wherein the ownership structure associated with a content unit is stored in a relational table.

7. The system as recited in claim 2 wherein the content unit is stored in a file pointed to by the information indicative of the leaf node.

8. The system as recited in claim 2 wherein the content unit is stored in the relational database.

9. The system as recited in claim 2 comprising a second leaf node wherein the leaf node and the second leaf node each have an edge to the parent node.

10. The system as recited in claim 2 wherein the node table further comprises information indicative of a second leaf node associated with a second hierarchical order and wherein the second leaf and the leaf node are associated with the same content unit.

11. A method for storing information in an a content management system, comprising:

parsing information arranged in a hierarchical order into a plurality of content units arranged in a hierarchical structure comprising at least one parent node, at least one leaf node, and at least one edge relating the parent node and the leaf node wherein the leaf node is indicative of at least one of the plurality of content units, the parent node and the edge are indicative of a hierarchical order of the information;

providing a relational database comprising a node table and an edge table;

storing the hierarchical structure in the relational database such that the information indicative of the edge is stored in the edge table, information indicative of the parent node is stored within the node table, and information indicative of the leaf node is stored in the node table; and content units are stored in a location accessible by the database whereby the location of the content unit can be determined from the information indicative of the leaf node.

12. The method as recited in claim 11 wherein the at least one parent node is indicative of a category of the content unit.

13. The method as recited in claim 11 wherein the content unit comprises text.

14. The method as recited in claim 11 wherein the content unit comprises a graphic.

15. The method as recited in claim 11 further comprising an ownership structure, wherein the ownership structure associated with a content unit is stored in a relational table.

16. The method as recited in claim 11 wherein the content unit is stored in a file pointed to by the information indicative of the leaf node.

17. The method as recited in claim 11 wherein the content unit is stored in the relational database.

18. The method as recited in claim 11 comprising a second leaf node wherein the leaf node and the second leaf node each have an edge to the parent node.

19. The method as recited in claim 11 wherein the node table further comprises information indicative of a second leaf node associated with a second hierarchical order and wherein the second leaf and the leaf node are associated with the same content unit.

20. The method as recited in claim 11 wherein the hierarchical order comprises an ordering based on internal document divisions.

21. The method as recited in claim 20 wherein the internal document divisions comprise chapter headings.

22. The method as recited in claim 20 wherein the internal document divisions comprise paragraph level divisions.

* * * * *